United States Patent

Huang Liu

[11] Patent Number: 5,942,172
[45] Date of Patent: Aug. 24, 1999

[54] METHOD FOR MAKING A SHOE PAD

[76] Inventor: Su-Man Huang Liu, 7F-4, No. 18, Lane 19, Sec. 1, Shuang Shyr Rd., Taichung, Taiwan

[21] Appl. No.: 09/056,854

[22] Filed: Apr. 8, 1998

[51] Int. Cl.[6] .............................. B29C 44/02; B29C 44/06
[52] U.S. Cl. .......................... 264/46.4; 264/51; 264/257; 425/119
[58] Field of Search ............................ 425/119; 264/321, 264/46.4, 51, 257

[56] References Cited

U.S. PATENT DOCUMENTS

| 3,355,535 | 11/1967 | Hain et al. | 264/321 |
| 3,541,646 | 11/1970 | Baudou | 425/119 |
| 3,983,204 | 9/1976 | Opinsky et al. | 425/119 |
| 4,032,611 | 6/1977 | Fukuoka | 425/119 |
| 4,778,145 | 10/1988 | Savori et al. | 425/119 |
| 5,318,645 | 6/1994 | Yang | 264/46.4 |
| 5,503,786 | 4/1996 | Yang | 264/46.4 |
| 5,827,459 | 10/1998 | Allen et al. | 264/46.4 |
| 5,843,352 | 12/1998 | Chi | 264/51 |
| 5,868,981 | 2/1999 | Bisconti | 264/51 |
| 5,885,500 | 3/1999 | Tawney et al. | 264/321 |

*Primary Examiner*—Allan R. Kuhns
*Attorney, Agent, or Firm*—Browdy and Neimark

[57] ABSTRACT

A method for making a shoe pad is composed of a first step in which a foot-shaped body is formed of a foamable material. A shoe tree of a heat-resistant material is used as an inner mold over which the foot-shaped body is fitted. The inner mold and the foot-shaped body are contained in a shoe-shaped outer mold, which is then heated to cause the foot-shaped body to foam. The outer mold is cooled to allow the foot-shaped body to take form of the shoe pad. Upon completion of the process of cooling the outer mold, the outer mold is opened to remove the shoe pad from the inner mold.

8 Claims, 2 Drawing Sheets

METHOD FOR MAKING A SHOE PAD

FIELD OF THE INVENTION

The present invention relates generally to a method for making a shoe accessory, and more particularly to a method for making a shoe pad.

BACKGROUND OF THE INVENTION

Shoe pads made by the conventional method are often found to be defective in design in that they are incapable of attaining the intended purposes of protecting and soothing the feet, and that they do not fit snugly enough to prevent the convection of cold air and warm air. As a result, conventional shoe pads are incapable of keeping the feet warm. In addition, such shoe pads can hamper walking or the running.

The conventional method for making a shoe pad is in fact rather primitive in design in that it makes use of a basic material of high molecular weight, which is cut to a footlike pattern. The shoe pads so made by the conventional method are incapable of fitting snugly and comfortably the feet of most people.

SUMMARY OF THE INVENTION

The primary objective of the present invention is therefore to provide a method for making a shoe pad capable of fitting a foot snugly to keep the foot warm in the winter.

It is another objective of the present invention to provide a method for making a shoe pad capable of soothing a foot.

In keeping with the principle of the present invention, the foregoing objectives of the present invention are accomplished by a method for making a shoe pad, which comprises a first step of preparing a shoe pad basic material. A shoe tree is selected for use as an inner mold. The shoe pad basic material is then fitted over the shoe tree, which is then arranged in an outer mold before being heated for a period of time to allow the shoe pad basic material to foam. The inner mold and the outer mold are cooled before the outer mold is opened to remove a shoe pad from the inner mold.

DETAILED DESCRIPTION OF THE INVENTION

Figure 1:
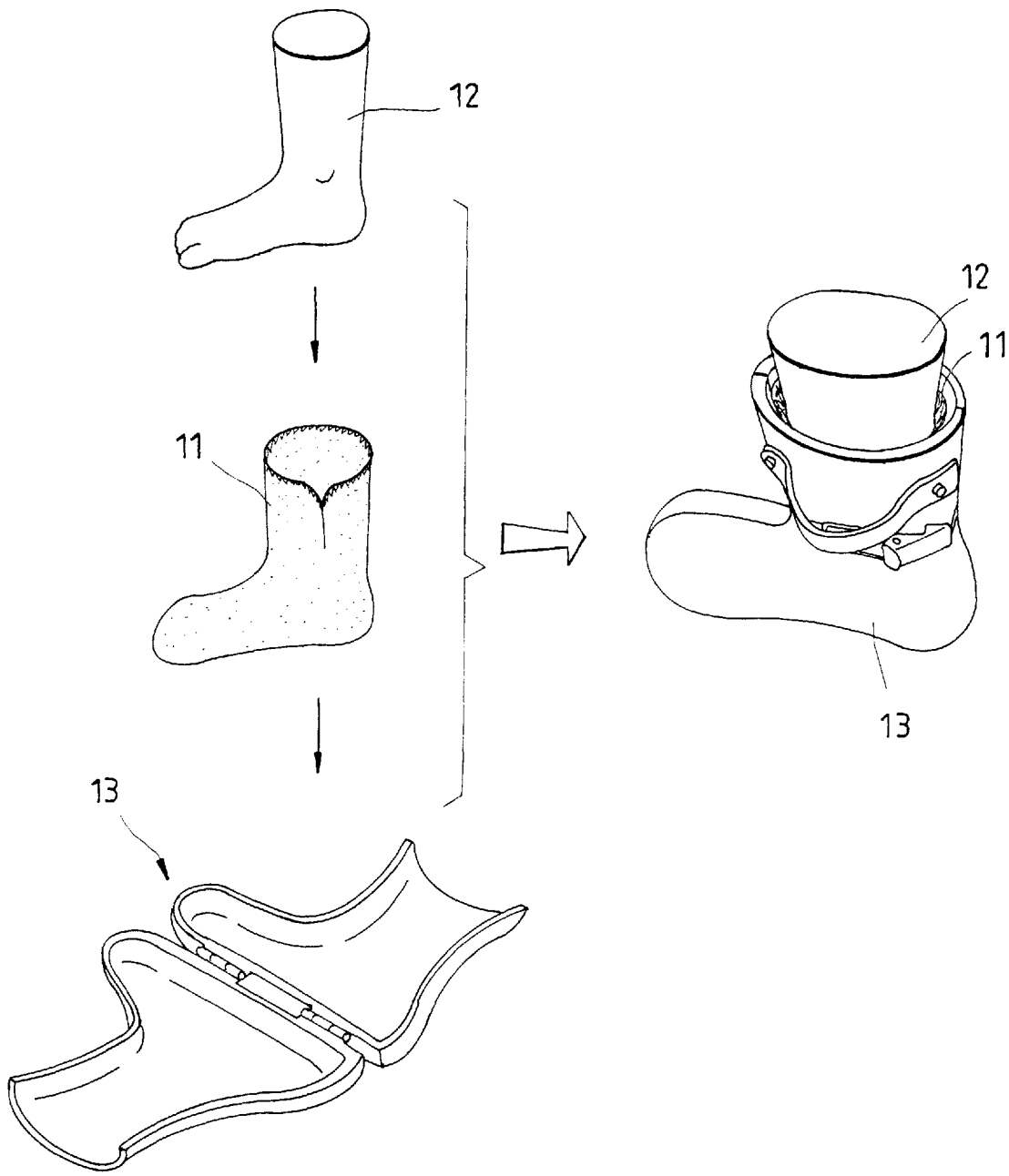
FIG. 1 shows an operational flow diagram of a method embodied in the present invention for making a shoe pad.
Figure 2:
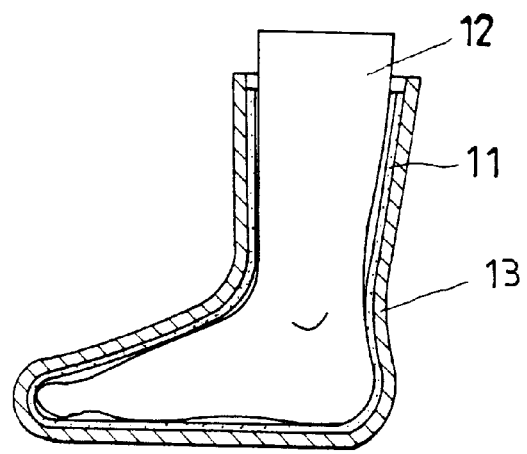
FIG. 2 shows a schematic view of a foot-shaped body of the method of the present invention before the foaming of the foot-shaped body is completed.
Figure 3:
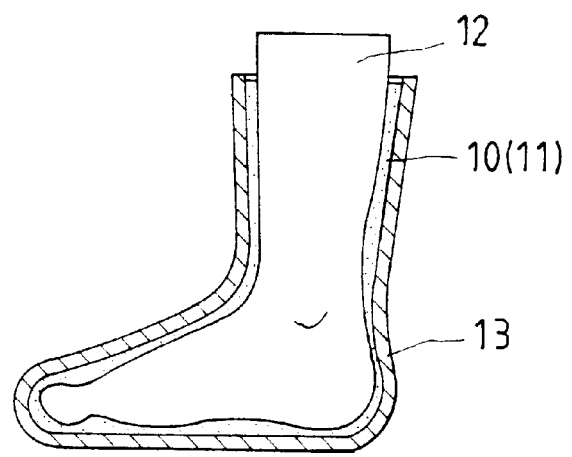
FIG. 3 shows a schematic view of the foot-shaped body of the method of the present invention after the foaming of the foot-shaped body is completed.

As shown in FIGS. 1–3, a method embodied in the present invention for making a shoe pad 10 is composed of a first step in which a foot-shaped body 11 is formed of a foamable material, such as EVA (ethylene vinyl acetate). In the meantime, a shoe tree made of a heat-resistant material is used as an inner mold 12, while a shoe-shaped outer mold 13 is formed of a heat-resistant material such that the outer mold 13 is made up of two symmetrical parts 131 and 132. The foot-shaped body 11 is fitted over the inner mold 12. The foot-shaped body 11 and the inner mold 12 are then contained in the outer mold 13 before the two symmetrical parts 131 and 132 of the outer mold 13 are joined together to seal off the outer mold 13. The outer mold 13 is heated at 120° C. for 30 minutes to bring about the foaming of the foot-shaped body 11 such that the inner surface of the foot-shaped body 11 is in an intimate contact with the outer surface of the inner mold (shoe tree) 12. The outer mold 13 is cooled at a temperature, which is lower than the room temperature, until the foot-shaped body 11 takes form of the shoe pad 10. The outer mold 13 is opened to remove the shoe pad 10 from the inner mold 12.

In order to make sure that the shoe pad 10 is shaped as desired, the foot-shaped body 11 may be vulcanized when the heating process is under way. In addition, a similar result may be attained by covering the inner and the outer edges of the foot-shaped body 11 with a piece of cloth (not shown in the drawing) before the foot-shaped body 11 is fitted over the inner mold 12. Moreover, in another embodiment the upper end of the foot-shaped body 11 is sewn with a machine before the foot-shaped body 11 is fitted over the inner mold 12, as shown in FIG. 1.

It must be noted here that the outer mold 13 containing the foot-shaped body 11 and the inner mold 12 is heated at a temperature ranging between 100 and 140 degrees in Celsius for a period lasting between 20 and 40 minutes.

What is claimed is:

1. A method for making a shoe pad, said method comprising the steps of:

(a) forming a foot-shaped body of a foamable material;

(b) forming an inner mold of a heat-resistant material such that the inner mold has the profile of a shoe tree;

(c) forming a shoe-shaped outer mold of a heat-resistant material;

(d) fitting the foot-shaped body over the inner mold (e) containing the foot-shaped body and the inner mold in the outer mold;

(f) heating the outer mold containing the inner mold and the foot-shaped body at a temperature ranging between 100 and 140 degrees in Celsius for a period lasting between 20 and 40 minutes so as to foam the foamable material;

(g) cooling the outer mold at a temperature until the foot-shaped body takes form of the shoe pad; and (h) opening the outer mold to remove the shoe pad from the inner mold.

2. The method as defined in claim 1, wherein the foot-shaped body is formed of ethylene vinyl acetate.

3. The method as defined in claim 1, wherein the outer mold containing the foot-shaped body and the inner mold is heated at 120 degrees in Celsius for 30 minutes.

4. The method as defined in claim 1, wherein the temperature at which the outer mold is cooled in the step (g) is lower than room temperature.

5. The method as defined in claim 1, wherein an upper end of the foot-shaped body is sewn with a machine before the foot-shaped body is fitted over the inner mold.

6. The method as defined in claim 1, wherein said outer mold is composed of two symmetrical parts.

7. The method as defined in claim 1, wherein the foot-shaped body is vulcanized in the step (f) in which the foot-shaped body is heated.

8. The method as defined in claim 1, wherein an inner edge and an outer edge of the foot-shaped body are covered with a piece of cloth before the foot-shaped body is fitted over the inner mold.

* * * * *